(12) United States Patent
Schell et al.

(10) Patent No.: US 8,295,656 B2
(45) Date of Patent: Oct. 23, 2012

(54) METHOD AND APPARATUS FOR COMPENSATING POLARIZATION-DEPENDENT FREQUENCY SHIFTS IN OPTICAL WAVEGUIDES

(75) Inventors: Martin Schell, Berlin (DE); Norbert Keil, Berlin (DE); Huihai Yao, Berlin (DE); Crispin Zawadzki, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 196 days.

(21) Appl. No.: 12/667,556

(22) PCT Filed: Jun. 23, 2008

(86) PCT No.: PCT/EP2008/057966
§ 371 (c)(1),
(2), (4) Date: Apr. 27, 2010

(87) PCT Pub. No.: WO2009/003864
PCT Pub. Date: Jan. 8, 2009

(65) Prior Publication Data
US 2010/0209039 A1 Aug. 19, 2010

(30) Foreign Application Priority Data
Jul. 4, 2007 (DE) .......................... 10 2007 031 864

(51) Int. Cl.
*G02F 1/035* (2006.01)
(52) U.S. Cl. .................. 385/3; 385/11; 385/14; 385/40; 385/132; 356/450

(58) Field of Classification Search .................. 385/1, 2, 385/3, 14, 11, 40, 129–132; 356/450
See application file for complete search history.

(56) References Cited

U.S. PATENT DOCUMENTS 6,724,957 B2    4/2004   Saida et al. ..................... 385/27
(Continued)

FOREIGN PATENT DOCUMENTS
EP          0756184 A2      1/1997
(Continued)

OTHER PUBLICATIONS

C.R. Doerr, M. Cappuzzo, A. Wong-Foy, L. Gomez, E. Laskowski, E. Chen; potentially inexpensive 10-Gb/s tunable dispersion compensator with low polarization sensitivity. Photonics Technology Letters, vol. 16, Issue: 5, pp. 1340-1342.

(Continued)

*Primary Examiner* — Brian M. Healy
*Assistant Examiner* — Andrew Jordan
(74) *Attorney, Agent, or Firm* — Brinks Hofer Gilson & Lione

(57) ABSTRACT

The invention relates to a method and to an apparatus for compensating the polarization-dependent shift of the center frequency in an optical filter comprising an interferometer by way of compensating the birefringence in at least one waveguide of the interferometer, wherein at least one half-wave plate is arranged into the optical path of the interferometer and at least a section of the waveguide (16, 17) on the right and on the left of the half-wave plate (11) is brought to a pre-selectable temperature, and wherein at least one section on the right of the half-wave plate (11) is brought to a first temperature $T_1$, and at least one section on the left of the half-wave plate (11) is brought to a second temperature $T_2$.

16 Claims, 1 Drawing Sheet

U.S. PATENT DOCUMENTS

Figure 1:
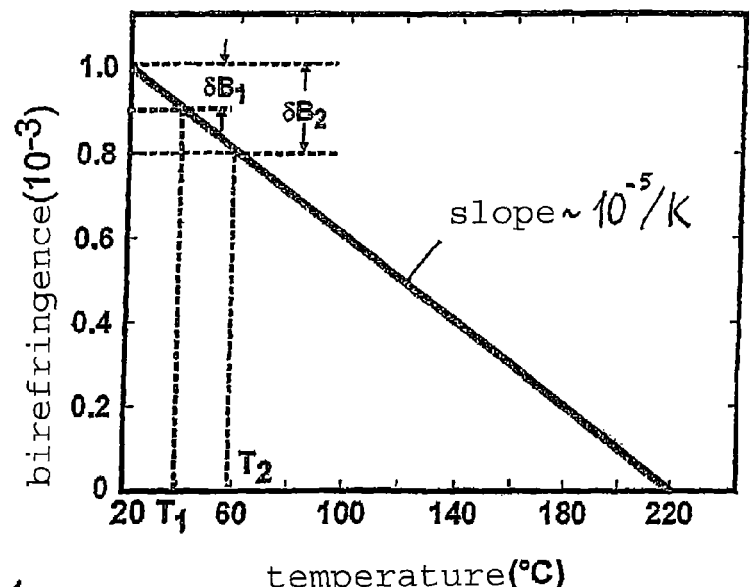

| | | | |
|---|---|---|---|
| 2001/0009595 A1* | 7/2001 | Okuno et al. | 385/14 |
| 2003/0031406 A1 | 2/2003 | Saida et al. | 385/27 |
| 2004/0136647 A1 | 7/2004 | Mizuno et al. | 385/24 |
| 2010/0119189 A1* | 5/2010 | Nasu et al. | 385/1 |
| 2011/0103736 A1* | 5/2011 | Hashizume et al. | 385/11 |

FOREIGN PATENT DOCUMENTS

| | | |
|---|---|---|
| EP | 1286192 A2 | 2/2003 |
| GB | 2269678 A | 2/1994 |

OTHER PUBLICATIONS

C.R. Doerr, D.M. Gill, et al.: Monolithic demodulator for 40 Gb/s DQPSK using a star coupler, J. Lightwave Technol. vol. 24, p. 171-174 (2006).

S.L. Jansen, et al.: 26×42.8-Gbit/s DQPSK transmission with 0.8 bit/sHz spectral efficiency over 4,500-km SSMF using optical phase conjugation, EC02005, PDTh4.1.5 (2005).

H. Kim, P. Winzer: Frequency offset tolerance between optical source and delay interferometer in DPSK and DQPSK systems, OFC 2003, p. 118-119 (2003).

H.H. Yaffe, C.H. Henry, et al.: Polarization-independent silica-on-silicon Mach-Zehnder Interferometers, J. Lightwave Technol. vol. 12, p. 64-67 (1994).

Takiguchi, K. Okamoto, K. Inoue, Y. Ishii, M. Moriwaki, K. Ando, S.: Planar lightwave circuit dispersion equalizer module with polarization insensitive properties. Electronics Letters, vol. 31, Issue 1, pp. 57-58.

* cited by examiner

METHOD AND APPARATUS FOR COMPENSATING POLARIZATION-DEPENDENT FREQUENCY SHIFTS IN OPTICAL WAVEGUIDES

The invention relates to a method and to an apparatus for compensating the polarization-dependent shift of the center frequency in an optical filter comprising an interferometer by way of compensating for the birefringence in at least one waveguide of the interferometer, wherein at least one half-wave plate is inserted into the beam path of the interferometer and at least a section of the at least one waveguide to the right and to the left of the half-wave plate is brought to a pre-selected temperature.

Interferometers of the kind cited in the beginning are used in various applications for the optical data transmission in different applications, e.g. in optical switches, in variable optical attenuators, in optical modulators, in demultiplexers used in OTDM systems, in DPSK methods, in DQPSK methods as well as an array of sensor applications.—These uses typically involve a Mach-Zender interferometer; however, a Michelson interferometer may be used as well.

It is known to integrate Mach-Zender Interferometers together with active or passive components in a planar integrated circuit. Such Mach-Zender interferometers integrated in planar integrated circuits are compact, easy to control and cost effective.

These types of Mach-Zender interferometers, however, exhibit a transfer behavior in optical filters or switches that is a function of the polarization of the incident light. This polarization-dependency restricts the range of application of integrated Mach-Zender interferometers in optical communications engineering at high bandwidths and/or high transmission rates. For applications in DPSK, DQPSK, OTDM or similar systems, the requirements are exceptionally high for polarization-independence of transmission rates in order to achieve reliable demodulation of an arriving data stream. With known Mach-Zender interferometers, which are used as optical filters or switches in planar-integrated circuits, a polarization-dependent shift of the central frequency (PDFS) occurs that is so extensive that the known Mach-Zender interferometers are usually insufficient for the demands of DPSK-, DQPSK and OTDM Systems.

For example, delay-line interferometers (DLIs) are used for the demodulation on the receiver side in OTDM, DPSK or DQPSK systems. The allowable PDFS of such a DLI in a DQPSK system ranges at approximately ±200 MHz for a bit-rate of 40 Gb/s. Such PDFS requires that the birefringence be restricted in the optical paths of the interferometers to approx. $\pm 2 \times 10^{-6}$ in the C and L bands.

For Mach-Zender interferometers in planar integrated circuits, the birefringence of the waveguide equals approximately $B_{WG} \sim 10^{-3}$, and the PDFS accordingly equals approximately ±100 GHz. This birefringence is primarily induced by tension. Thus, it changes with the temperature on a linear basis. The corresponding slope (in this case, the decrease) S is determined based on $S=B_{WG}/\Delta T_{Proc}$, with $\Delta T_{Proc}=T_f-T_0$ denoting the difference between the final temperature of the production process $T_f$ and the operating temperature $T_0$. The value of S is always negative and ranges at approximately $-10^{-5}$ K$^{-1}$ for polymer waveguides; the typical temperature difference $\Delta T_{Proc}$ amounts approximately 100 K to 200 K.

From the prior art it is known that to restrict the PDFS, a Mach-Zender interferometer must be equipped with a half-wave plate made of polyimide, which must be placed in the center of the transmission path. The half-wave plate thereby causes a rotation of the polarization vector, so that the PDFS may be equalized in the first section of the interferometer and in the second section of the interferometer. Under practical conditions, this equalization is incomplete, so that an interferometer equipped as aforementioned achieves a PDFS of approximately ±1000 MHz. This means that the birefringence equals approximately $10^{-5}$.

However, this measure is insufficient to satisfy the demands on the PDFS in a DQPSK system as illustrated above.

The object of the present invention therefore is to provide a method and an apparatus for the diminishment of polarization-dependent shift of the center frequency (PDFS) in optical filters, in order to achieve higher data rates and/or bandwidths in OTDM, DPSK or DQPSK systems compared to conventional optical filters.

The object is solved by a method for compensating polarization-dependent shifts of the central frequency in an optical filter, which comprises an interferometer, by compensation of the birefringence in at least one waveguide of the interferometer, wherein at least one half-wave plate is inserted into the beam path of the interferometer, and at least a section of at least one waveguide is brought to a pre-selected temperature on the right and left of the half-wave plate, and wherein at least one section on the right of the half-wave plate is brought to a first temperature $T_1$ and at least one section on the left of the half-wave plate is brought to a second temperature $T_2$.

Furthermore, the object is solved by providing an interferometer with two arms that each comprise at least one waveguide, wherein a half-wave plate is arranged into both arms of the interferometer, and at least a section of the waveguides of both arms of the interferometer to the right and left of the half-wave plate are in a heat-exchange contact to at least one heating element each, and the heating elements placed in the arm with the larger optical path length of the interferometer to the right and left of the half-wave plate each exhibit a length $\delta l1$ and the heating elements placed in the other arm of the interferometer to the right and left of the half-wave plate each exhibit a length of $\delta l2 = \delta l1 * L/(L+\Delta L)$.

Useful embodiments of the invention are subject to the dependent claims.

According to the invention, in the method for compensation of polarization-dependent frequency shifts in optical waveguides, at least one half-wave plate is introduced into the beam path and at least a predefined section of the optical waveguide on both sides of the half-wave plate is heated. To do so, at least one section of each waveguide is brought to a pre-selected temperature. This is achieved by delivering heat to the waveguides at the right and left of the half-wave plate by means of at least two heating elements. These heating elements may be embodied as heating electrodes.

According to an embodiment of the invention, the tension-induced birefringence of the waveguide, and thus the Mach-Zender interferometer's residual PDFS following installation of the half-wave plate, may be compensated by bringing at least one section to the right of the half-wave plate to a first temperature $T_1$, and at least one section to the left of the half-wave plate to a second temperature, $T_2$, which differs from $T_1$. Preferably, the sections on each side of the half-wave plate each comprise a plurality of interconnected sections, so that a single section on the right and a single section on the left side of the half-wave plate is heated by the heating elements.

By heating the waveguides, their length and/or the refractive index and/or the tension-induced birefringence changes, so that a remaining asymmetry of the optical paths may be balanced on both the right and left of the half-wave plate by variable heating.

In an embodiment of the invention, the sections to the right and the left of the half-wave plate each feature a heating electrode of equal length $\delta l1$ and their respective temperatures $T_1$ and $T_2$ satisfy the following condition:

$$T_2-T_1=(B_{res}/B_{WG})*\Delta T_{Proc}*(L/\delta l1),$$

wherein $B_{res}$: represents the birefringence corresponding to the residual PDSF
$B_{WG}$: represents the birefringence of the waveguide;
$\Delta T_{Proc}$: represents the difference between the process temperature and the ambient temperature and
L: represents the length of the waveguide.

Preferably, the method will be used in an embodiment of the invention, which is distinguished by the fact that the waveguide is integrated into a Mach-Zender interferometer. In this case, the length of the upper arm of the Mach-Zender Interferometer is given by $(L+\Delta L)$, so that a temperature difference of the upper arm of the Mach-Zender interferometer may be given by $$T_2-T_1=(B_{res}/B_{WG})*\Delta T_{Proc}*\{(L+\Delta L)/\delta l1\},$$

For a Mach-Zender interferometer with a delay line in a DQPSK receiver, the delay time between both arms of the Mach-Zender interferometer must be equal during the period of the symbol. The heating electrode is used for this purpose, in order to coordinate the differences in optical path lengths. This is achieved by applying the temperature $T_{DLI}$, which is required to correct the differences in the optical path lengths.

An embodiment of the invention entails the following combination: Applying a temperature of $T_{DLI}$, reduced by half of the temperature difference $\Delta T=T_2-T_1$ required for compensating the PDFS to the sections of the waveguide on the right (or left) of the half-wave plate, as well as applying a temperature of $T_{DLI}$, increased by half of the temperature difference $\Delta T$ to the sections of the waveguide to the left (or right) of the half-wave plate. The results from this are temperatures from $(T_{DLI}-\Delta T/2)$ and $(T_{DLI}+\Delta T/2)$.

For polymer waveguides, only a small electrical power is required due to the high thermo-optical coefficients and the small thermal conductivity of the polymer materials in order to cover a broad tuning range.

If the invention is used in Mach-Zender interferometers, it may be advantageous to install a half-wave plate in the beam path of the waveguides in both arms of the Mach-Zender interferometer. Using this embodiment, the PDFS of the Mach-Zender interferometer may be compensated to a much higher extent than previously known, because pre-selected temperatures may be applied at least to a section of the waveguide both in the upper arm as well as in the lower arm of the Mach-Zender interferometer to the right and left of the half-wave plate, by bringing these sections into a heat-exchange contact with at least one heating element. The complexity of this embodiment is reduced if the waveguides on the right of the half-wave plate in both arms of the Mach-Zender interferometer are brought—at least in a section—to the equal temperature $T_r$, preferably to $T_r=T_{DLI}-\Delta T/2$, and likewise if the two waveguides on the left of the half-wave plate are brought to the same temperature $T_1$, preferably $T_1=T_{DLI}+\Delta T/2$. This may be achieved through the commensurate selection of the lengths of the heated section, or the length of the respective heating elements respectively.

The heated sections on each side of the half-wave plate may comprise several sub-sections. However, preferably a single continuous section will be heated both on the right and left of the half-wave plate. Accordingly, only one heating element is needed on each side for each waveguide. If the length of the heated sections in the upper arm (or the length of the heating element, respectively) both right and left equals $\delta l1$, then the length of the sections heated in the lower arm (or the length of the heating element, respectively) both right and left of the half-wave plate each shall equal $\delta l2=\delta l1*L/(L+\Delta L)$.

According to the invention, it becomes possible to lower the birefringence to $10^{-5}$, which is made possible by means of the half-wave plate made of polyimide, even further. As values equal to $10^{-6}$ or below may be achieved for the birefringence, the high demands on waveguides in planar integrated circuits in DQPSK systems and other areas may be satisfied.

In a preferred embodiment of the invention, the assembly according to the invention is combined with a data processing device for controlling the temperatures of the heating elements.

A computer program, based on the invention, enables a data processing device, after it has been loaded into the memory of the data processing device, to execute a method for the compensation of polarization-dependent frequency shifts in optical waveguides, wherein the waveguides to the right and left of the half-wave plate may be brought to pre-selected temperatures, at least in a section. The computer program according to the invention additionally may keep the temperatures at a constant level.

Such computer programs may, for example, be available for download (in exchange for a fee or for free, or are openly accessible or password protected) in a data or communications network. The computer programs obtained in this manner may then be made useable through a method by which a computer program is downloaded from an electronic data network, such as from the Internet, for example, onto the data network of the connected data processing device.

In order to execute the method for compensation of polarization-dependent frequency shifts in optical waveguides, it is intended to deploy a computer-readable storage medium in which a program is stored that enables a data processing device (after it has been loaded into the memory of the data processing device) to execute the method for compensation of polarization dependent frequency shifts in optical waveguides wherein at least a section of the waveguide to the right and left of the half-wave plate may be set at pre-selectable temperatures.

The invention is described in greater detail hereinafter, making reference to the figures in the drawings on an embodiment. It illustrates FIG. 1 a temperature/birefringence curve of a polymer waveguide, FIG. 2 schematic depiction of an embodiment of the invention.

In FIG. 1, the shape of a temperature/birefringence curve of a polymer waveguide is depicted. The slope of the birefringence curve for polymer waveguides ranges in the area of $10^{-5}/K$. If the temperature of the waveguide 16 is increased from an ambient temperature of $T_0=20°$ C. to $T_1$, the birefringence of waveguide 16 decreases by the value $\delta B_1=|S*(T_1-T_0)|$, where S represents the slope of the curve. The corresponding polarization phase shift equals:

$$\Delta\phi_1=2\pi/\lambda*\delta B_1*\delta l1,$$

wherein $\delta l1$ is the length of the heating element 12. The value $\Delta\phi_1$ is always negative, if the temperature increases. Nonetheless, passage through the half-wave plate 11 converts this phase shift into a positive birefringence, which is expressed by $+|\Delta\phi_1|$. The right heating electrode 13 is heated to a temperature $T_2$, which results in a change in the waveguide's birefringence to $\delta B_2=|S*(T_2-T_0)|$. The corresponding phase shift is then:

$$\Delta\phi_2=2\pi/\lambda*\delta B_2*\delta l1.$$

The induced polarization phase shift of both heating elements 12, 13 thus may be indicated as follows:

$$\Delta\phi_2-\Delta\phi_1=2\pi/\lambda*(\delta B_2-\delta B_1)*\delta l1.$$

The remaining PDFS may be viewed as the residual polarization phase shift:

$$\Delta\Box_{res}=2\pi/\lambda*(B_{res}*(L+\Delta L)),$$

wherein L denotes the length of the lower (shorter) arm 17 and (L+ΔL) indicates the upper (longer) arm 16 of the Mach-Zender interferometer.

For a total compensation of the phase shift, the condition $\Delta\Box_{res}+(\Delta\phi_1-\Delta\phi_2)=0$ applies, i.e.

$$2\pi/\lambda*B_{res}*(L+\Delta L)=2\pi/\lambda*S*(T_2-T_1)*\delta l1,$$

which yields the following temperature difference for heating elements 12, 13:

$$T_2-T_1=(B_{res}/B_{WG})*\Delta T_{Proc}*\{(L+\Delta L)/\delta l1\}.$$

Depending on the sign of Bres, the difference $T_2-T_1$ is positive or negative. The Quotient $B_{res}/B_{WG}$ will lie approximately in the range of $10^{-2}$ through $10^{-3}$, $\Delta T_{Proc}$ approximately in the range of 100 K through 200 K, the length factor $\{(L+\Delta L)/\delta l1\}$ amounts approximately 10. It can be seen that a temperature difference of only a few degrees is sufficient in order to balance the remaining birefringence of the DLI.

For Mach-Zender interferometers that use a delay line in DQPSK receivers, a heating electrode is needed which compensates the frequency shift between the optical source and the DLI through a precise coordination of the optical path length difference of the delay line. For polymer waveguides, due to the high thermo-optic coefficients and the low thermal conductivity of the polymer material, only a small electrical power is required in order to cover a broad setting range.

In cases in which a half-wave plate 11 is used, the upper heating electrodes 12, 13 for compensating the optical path length are arranged advantageously to the left and right of the half-wave plate 11. The equalization effect for compensation of the PDFS can thereby be reached by heating both heating electrodes 12, 13 to different temperatures. If, for compensation of differences in lengths, the temperature of the waveguide is brought to the value $T_{DLI}$, and for compensation of the PDFS a temperature difference of $\Delta T=T_2-T_1$ is required, then an embodiment would entail bringing the heating electrodes 12, 13 to temperatures ($T_{DLI}-\Delta T/2$) resp. ($T_{DLI}+\Delta T/2$). Since no special structure is required, the invention provides a compact and cost-effective solution that uses minimal power consumption.

Figure 2:
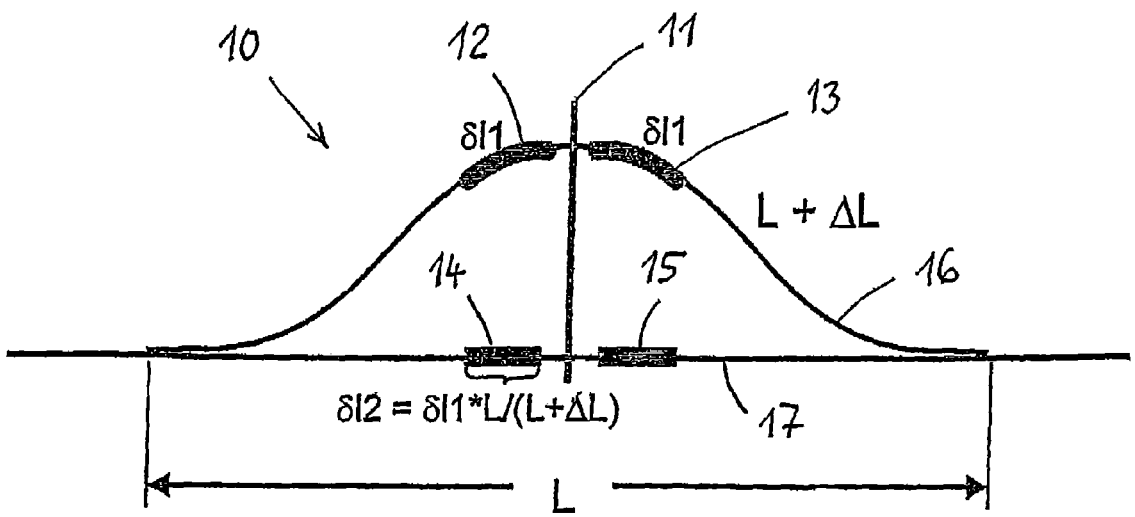

FIG. 2 details a schematic illustration of an embodiment of the invention for equalization of birefringence. In this embodiment, an integrated Mach-Zender interferometer with polymer waveguides is used which is combined with a half-wave plate 11 and four heating elements 12, 13, 14, 15. The path difference of the Mach-Zender interferometer would be ΔL; the length of each heating element 12, 13 in the upper arm 16 would be δl1. These two heating elements 12, 13 in the upper arm 16 can be used both for compensation of the PDFS as well as for compensation of the path length.

In order to compensate the PDFS in the entire Mach-Zender interferometer 10, the two heating elements 14, 15 must simultaneously balance the lower arm 17. If the heating elements 14, 15 of the lower arm 17 shall be heated to the same temperature as the heating elements 12, 13 of the upper arm, then the heating elements 14, 15 of the lower arm 17 must exhibit a length of $\delta l2=\delta l1*L/(L+\Delta L)$.

The invention is not restricted to the preferred embodiments presented. Rather, a collection of variations is conceivable, that could make use of the configuration based on the invention, and the method based on the invention, even in essentially different embodiments.

LIST OF REFERENCE NUMBERS

10 Mach-Zender-interferometer
11 half-wave plate
12 Heating element
13 Heating element
14 Heating element
15 Heating element
16 Waveguide, upper arm of the Mach-Zender interferometer
17 Waveguide, lower arm of the Mach-Zender interferometer

The invention claimed is:

1. A method for compensating the polarization-dependent shift of the center frequency of an optical filter, the filter comprising
an interferometer which comprises at least an upper and a lower arm, at least one of these arms comprising at least one waveguide, and
at least one half-wave plate being arranged in the at least one waveguide of the interferometer
wherein the method comprises the step of bringing at least a section of the at least one waveguide on the right and left of the half-wave plate to a pre-selectable temperature, wherein
at least one section on the right of the half-wave plate is brought to a first temperature $T_1$ and
at least one section on the left of the half-wave plate is brought to a second temperature $T_2$
wherein the at least one sections to the right and left of the half-wave plate each exhibit the equal length δ/1 and the first and second temperatures $T_1$ and $T_2$ satisfy the following condition:

$$T_2-T_1=(B_{res}/B_{WG})*\Delta T_{Proc}*(L/\delta l1),$$

wherein
$B_{res}$: denotes the birefringence corresponding to the residual polarization-dependent frequency shift
$B_{wo}$: denotes the birefringence of the waveguide,
$\Delta T_{Proc}$: denotes the difference between the final temperature of a production process of the interferometer and the ambient temperature;
L: is the length of the waveguide; and
δl1: is the length of the at least one section to the right and left of the half-wave plate.

2. The method according to claim 1, comprising further the step of adjusting the difference in the optical path lengths of the at least two arms of the interferometer to a pre-defined value by
bringing at least a section to the right of the half-wave plate of the arm with the larger optical path length of the interferometer to a first temperature $T_1$, and
bringing at least a section to the left of the half-wave plate of the arm with the larger optical path length of the interferometer to a second temperature $T_2$.

3. The method according to claim 2, wherein the sections on the one side of the half-wave plate are brought to a temperature of ($T_{DLI}-\Delta T/2$) and the sections on the other side of the half-wave plate are brought to a temperature of ($T_{DLI}+\Delta T/2$), wherein
TDL1: is the temperature required for adjusting the difference of the optical path lengths
ΔT: is the temperature difference required for compensation of the polarization-dependent frequency shift.

4. The method according to claim 1, wherein
a half-wave plate is arranged in both arms of the interferometer, and the polarization-dependent frequency shift of the interferometer is compensated, in that at least one section of every waveguide on the right and left of the half-wave plate both in the upper arm and the lower arm of the interferometer are brought to a pre-selectable temperature.

5. The method according to claim 4, wherein
the at least one section of the upper arm of the interferometer on the right of the half-wave plate and the at least one section of the lower arm of the interferometer on the right of the half-wave plate are brought to the first temperature $T_1$, and the at least one section of the upper arm of the interferometer to the left of the half-wave plate and the at least one section of the lower arm of the interferometer to the left of the half-wave plate are brought to the second temperature $T_2$.

6. The method according to claim 5, wherein
the sections of the upper arm of the interferometer on the right and on the left of the half-wave plate which are brought to a pre-selectable temperature so that each exhibit the same length δl1, and
the sections of the lower arm of the interferometer on the right and left of the half-wave plate which are brought to a pre-selectable temperature by at least one heating element so that each exhibit a the same length δl2=δl1*L/(L+ΔL), wherein
L denotes the lengths of the lower arm of the interferometer and
(L+ΔL) denotes the lengths of the upper arm of the interferometer.

7. A method for compensating the polarization-dependent shift of the center frequency of an optical filter, the filter comprising
an interferometer which comprises at least an upper and a lower arm, at least one of these arms comprising at least one waveguide, and
at least one half-wave plate being arranged in the at least one waveguide of the interferometer wherein the method comprises the step of
bringing at least a section of the at least one waveguide on the right and left of the half-wave plate to a pre-selectable temperature, wherein at least one section on the right of the half-wave plate is brought to a first temperature $T_1$ and
at least one section on the left of the half-wave plate is brought to a second temperature $T_2$, wherein
the at least one sections to the right and left of the half-wave plate each exhibit the equal length δl1 and the first and second temperatures $T_1$ and $T_2$ satisfy the following condition:

$$T_2 - T_1 = (B_{res}/B_{WG})*\Delta T_{Proc}*(L/\delta l 1),$$

Wherein
$B_{res}$: denotes the birefringence corresponding to the residual polarization-dependent frequency shift
$B_{WG}$: denotes the birefringence of the waveguide,
$\Delta T_{Proc}$: denotes the difference between the final temperature of the production process of the Mach-Zender interferometer and the ambient temperature; and
L: is the length of the lower waveguide.

8. The method according to claim 7, comprising further the step of adjusting the difference in the optical path lengths of the at least two arms of the interferometer to a pre-defined value by
bringing at least a section to the right of the half-wave plate of the arm with the larger optical path length of the interferometer to a first temperature $T_1$, and
bringing at least a section to the left of the half-wave plate of the arm with the larger optical path length of the interferometer to a second temperature $T_2$, wherein the sections on the one side of the half-wave plate are brought to a temperature of $(T_{DLI} - \Delta TI2)$ and the sections on the other side of the half-wave plate are brought to a temperature of $(T_{DU} + \Delta T/2)$, wherein
$T_{DLI}$: is the temperature required for adjusting the difference of the optical path lengths
$\Delta T$: is the temperature difference required for compensation of the polarization-dependent frequency shift.

9. The method according to claim 7, wherein
a half-wave plate is arranged in both arms of the interferometer, and
the polarization-dependent frequency shift of the interferometer is compensated, in that at least one section of every waveguide on the right and left of the half-wave plate both in the upper arm and the lower arm of the interferometer are brought to a pre-selectable temperature, and wherein
the at least one section of the upper arm of the interferometer on the right of the half-wave plate and the at least one section of the lower arm of the interferometer on the right of the half-wave plate are brought to the first temperature $T_1$ and
the at least one section of the upper arm of the interferometer to the left of the half-wave plate and the at least one section of the lower arm of the interferometer to the left of the half-wave plate are brought to the second temperature $T_2$.

10. A computer program comprising program code for implementation of a method according to any of claims 1 to 9, if the computer program is executed on a computer.

11. A computer program with program code, which is stored on a machine-readable medium, for implementation of a method according to any of claims 1 to 9, if the computer program is executed on a computer.

12. An interferometer comprising
at least one upper and at least one lower arm,
each of these arms comprising at least one waveguide, wherein
in both arms of the interferometer, a half-wave plate is arranged and at least one section of every waveguide of both arms of the interferometer to the right and to the left of the half-wave plate are arranged in a heat exchange contact tO at least one dedicated heating element, wherein
the heating elements arranged on the upper arm with the larger optical path length of the interferometer each exhibit the length δl1 and
the heating elements arranged on the lower arm with the smaller optical path length of the interferometer on the right and left of the half-wave plate each exhibit the lengths δl2=δl1*L/(L+ΔL).

13. The interferometer according to claim 12, wherein the heating elements comprise heating electrodes.

14. The interferometer according to 12, comprising further data processing means for controlling the temperatures of the heating elements.

15. The interferometer according to claim 12, wherein the interferometer comprises a Mach-Zender interferometer.

16. An integrated circuit comprising an interferometer according to any of claims 12 to 15.

* * * * *